United States Patent
Sigurdh et al.

(10) Patent No.: US 11,852,071 B2
(45) Date of Patent: Dec. 26, 2023

(54) CRANKSHAFT, POWER UNIT, TWO STROKE PISTON ENGINE, AND HAND-HELD POWER TOOL

(71) Applicant: HUSQVARNA AB, Huskvarna (SE)

(72) Inventors: Patrik Sigurdh, Huskvarna (SE); Anders Hansson, Huskvarna (SE); Per-Arne Järnland, Huskvarna (SE); Johan Lönn, Jönköping (SE); Mikael Evergren, Ulricehamn (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/908,749

(22) PCT Filed: Mar. 16, 2021

(86) PCT No.: PCT/SE2021/050227
§ 371 (c)(1),
(2) Date: Sep. 1, 2022

(87) PCT Pub. No.: WO2021/201740
PCT Pub. Date: Oct. 7, 2021

(65) Prior Publication Data
US 2023/0128697 A1    Apr. 27, 2023

(30) Foreign Application Priority Data

Mar. 30, 2020   (SE) .................... 2050349-6

(51) Int. Cl.
*F02B 33/04*  (2006.01)
*F02F 3/24*   (2006.01)
*F16C 3/20*   (2006.01)

(52) U.S. Cl.
CPC ............... *F02B 33/04* (2013.01); *F02F 3/24* (2013.01); *F16C 3/20* (2013.01); *F16C 2322/50* (2013.01)

(58) Field of Classification Search
CPC .......... F02F 3/24; F02F 7/0004; F02F 7/0039; F16C 3/20; F16C 3/12; F16C 7/023; F16C 2322/50
See application file for complete search history.

(56) References Cited

U.S. PATENT DOCUMENTS 2,838,941 A    6/1958   Turlay
3,859,968 A    1/1975   Stinebaugh
(Continued)

FOREIGN PATENT DOCUMENTS

CN    2900901 Y     5/2007
CN    106122370 B   8/2018
(Continued)

OTHER PUBLICATIONS

International Search Report and Written Opinion for International Application No. PCT/SE2021/050227 dated Jun. 18, 2021.
(Continued)

*Primary Examiner* — Grant Moubry
(74) *Attorney, Agent, or Firm* — BURR & FORMAN LLP

(57) ABSTRACT

A crankshaft (1) for a crankcase scavenged two stroke piston engine (2) is disclosed. The crankshaft (1) is configured to rotate around a rotation axis (ax) during operation. The crankshaft (1) comprises a crankpin (3) configured to move in a crank plane (cp) during operation, and a first and a second counterweight (5, 7) arranged on either side (S1, S2) of the crank plane (cp). The first counterweight (5) has a first outer radius (r1) measured from the rotation axis (ax) and the second counterweight (7) has a second outer radius (r2) measured from the rotation axis (ax). The first outer radius (r1) is smaller than the second outer radius (r2). The present
(Continued)

disclosure further relates to a power unit (10), a crankcase scavenged two stroke piston engine (2), and a hand-held power tool (20).

20 Claims, 5 Drawing Sheets

(56) References Cited

U.S. PATENT DOCUMENTS

| | | |
|---|---|---|
| 4,881,427 A | 11/1989 | Yasutake |
| 5,203,230 A | 4/1993 | Distelrath |
| 2001/0004929 A1 | 6/2001 | Leith et al. |
| 2001/0035149 A1* | 11/2001 | Wiseman ............... F16H 21/365 |
| | | 74/25 |
| 2002/0104505 A1 | 8/2002 | Ericson |
| 2004/0035244 A1* | 2/2004 | Leith ..................... F16C 3/10 |
| | | 74/595 |
| 2005/0205043 A1* | 9/2005 | Schmidt .................. F16C 3/10 |
| | | 123/197.1 |
| 2007/0204829 A1* | 9/2007 | Takahashi ............. F02B 75/048 |
| | | 123/78 E |
| 2017/0234359 A1 | 8/2017 | Williams et al. |

FOREIGN PATENT DOCUMENTS

| | | |
|---|---|---|
| EP | 2461052 A2 | 6/2012 |
| GB | 2399157 A | 9/2004 |
| JP | 3-272313 A | 12/1991 |
| WO | 9822703 A1 | 5/1998 |
| WO | 2010017442 A1 | 2/2010 |

OTHER PUBLICATIONS

Search Report and Office Action for Swedish Application No. 2050349-6 dated Oct. 19, 2020.

* cited by examiner

CRANKSHAFT, POWER UNIT, TWO STROKE PISTON ENGINE, AND HAND-HELD POWER TOOL

TECHNICAL FIELD

The present disclosure relates to a crankshaft for a crankcase scavenged two stroke piston engine. The present disclosure further relates to a power unit for a crankcase scavenged two stroke piston engine, a crankcase scavenged two stroke piston engine, and a hand-held power tool comprising a crankcase scavenged two stroke piston engine.

BACKGROUND

A two-stroke engine is a type of internal combustion engine which completes a power cycle with two strokes of the piston during only one crankshaft revolution. The uppermost position of a piston in a cylinder is usually referred to as the top dead centre and the lowermost position of the piston in the cylinder is usually referred to as the bottom dead centre. Compared to four-stroke engines, two-stroke engines have a smaller number of moving parts, and consequently can be made more compact and significantly lighter. Therefore, two-stroke petrol engines are used in applications where mechanical simplicity, light weight, and high power-to-weight ratio are main concerns. Typical applications are hand-held tools such as chainsaws.

Most small sized two-stroke engines are crankcase-scavenged engines meaning that these engines use the area below the piston as a charging pump to build up pressure in the crankcase during the power stroke of the piston. Two-stroke engines are usually provided with a carburettor arranged to supply an air/fuel mixture to the crankcase. In the power stroke of a two-stroke engine, the increased pressure and temperature in the cylinder obtained by the combustion of fuel is partially converted into mechanical work supplied to a crankshaft of the engine. At the same time, the pressure in the crankcase increases as a result of the movement of the piston towards the bottom dead centre. An exhaust port arranged in the cylinder wall is opened to allow exhaust gases to flow out from the cylinder when the piston reaches a first position relative the cylinder in its movement towards the bottom dead centre. The piston continues the movement towards the bottom dead centre and when it reaches a second position, below the first position, an inlet port arranged in the cylinder wall is opened. The inlet port is fluidly connected to the crankcase via a scavenging channel. The air/fuel mixture in the crankcase is forced to flow into the cylinder via the inlet port by the overpressure in the crankcase.

The volume of the crankcase affects the scavenging efficiency of the engine, i.e. the efficiency of the transfer of the air/fuel mixture from the crankcase into the cylinder via the inlet port. A smaller volume of the crankcase increases the scavenging efficiency and a greater volume reduces the scavenging efficiency. In turn, the scavenging efficiency affects the operation and the power output of the engine. For this reason, some crankcase scavenged two stroke piston engines comprise fillers arranged on the crankshaft of the engine. The fillers reduce the free volume of the crankcase and thereby increases the scavenging efficiency of the engine. However, fillers may reduce lubrication of bearings of the engine, such as a crank bearing of the crankshaft of the engine. In additions, the fillers add costs, weight, and complexity to two-stroke engines, and in general, on today's consumer market, it is an advantage if products, such as two-stroke engines and associated components, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a crankshaft for a crankcase scavenged two stroke piston engine. The crankshaft is configured to rotate around a rotation axis during operation. The crankshaft comprises a crankpin configured to move in a crank plane upon rotation of the crankshaft, and a first and a second counterweight arranged on either side of the crank plane. The first counterweight has a first outer radius measured from the rotation axis and the second counterweight has a second outer radius measured from the rotation axis. The first outer radius is smaller than the second outer radius.

Since the first counterweight has a smaller outer radius than the second counterweight, the crankcase of an engine comprising the crankshaft can be designed to have a reduced free volume thereby increasing the scavenging efficiency of the engine. This because the first counterweight can be surrounded by a crankcase enclosure section with a reduced radius.

The crankpin of a crankshaft is arranged at a distance from the rotation axis of the crankshaft so as to provide a crank movement in the crank plane upon rotation of the crankshaft. A crankshaft further comprises a crankpin adjoining portion on either side of the crank plane. The radial distances between the rotation axis and radial outer portions of the crankpin adjoining portions puts limitations on the design of enclosure sections of the crankcase. In some designs, one of the crankpin adjoining portions needs to be larger in size than the other crankpin adjoining portion.

Thus, since the first and second counterweights have different outer radiuses, one of the crankpin adjoining portions is allowed to have a larger outer radius than the other crankpin adjoining portion. Thereby, the crankshaft according to the embodiments herein provides conditions for optimizing the measurements of a crankcase so as to provide a small free volume thereof. In this manner, the free volume of the crankcase can be reduced and the scavenging efficiency of an engine comprising the crankshaft can thereby be increased.

Accordingly, since the free volume of the crankcase can be reduced in this manner, the need for using fillers arranged on the crankshaft is reduced which potentially saves costs, weight, and complexity of the crankshaft. In addition, by not arranging fillers on the crankshaft, the lubrication of bearings of the engine can be increased, such as a crank bearing attached to the crankpin and main bearings supporting the crankshaft relative to a crankcase of the engine.

Accordingly, a crankshaft is provided overcoming, or at least alleviating, at least some of the above-mentioned problems and drawbacks. As a result, the above-mentioned object is achieved.

Optionally, the first outer radius is within the range of 0.8-0.99 of the second outer radius or is within the range of 0.91-0.97 of the second outer radius. Thereby, the first counterweight can be surrounded by a crankcase enclosure section with a reduced radius while allowing different sizes of the crankpin adjoining portions of the crankshaft. In this manner, the free volume of the crankcase can be reduced and the scavenging efficiency of an engine comprising the crankshaft can thereby be increased without using fillers on the crankshaft.

Optionally, the crankshaft comprises a first crankshaft portion comprising the first counterweight and a first crankpin adjoining portion arranged opposite to the first counterweight relative to the rotation axis, and wherein the first crankpin adjoining portion has an outer radius smaller than, or equal to, the first outer radius. Thereby, conditions are provided for optimizing the measurements of a crankcase so as to provide a small free volume thereof. In this manner, the free volume of the crankcase can be reduced and the scavenging efficiency of an engine comprising the crankshaft can thereby be increased without using fillers on the crankshaft.

Optionally, the first crankshaft portion comprises the crankpin, and wherein the first crankshaft portion constitutes a first one-piece crankshaft portion of the crankshaft. Thereby, the first crankshaft portion can be provided with a first crankpin adjoining portion having a small outer radius. This because first crankshaft portion comprises the crankpin and constitutes a first one-piece crankshaft portion of the crankshaft. Thereby, conditions are provided for optimizing the measurements of a crankcase so as to provide a small free volume thereof without using fillers on the crankshaft.

Optionally, the crankshaft comprises a second one-piece crankshaft portion comprising the second counterweight and a second crankpin adjoining portion arranged opposite to the second counterweight relative to the rotation axis. Thereby, a crankshaft is provided which may comprise a two-piece set of crankshaft portions. Since the second counterweight has a larger outer radius than the first counterweight, the second crankpin adjoining portion is allowed to be greater in size than the first crankpin adjoining portion. In this manner, conditions are provided for optimizing the measurements of a crankcase so as to provide a small free volume thereof without using fillers on the crankshaft.

Optionally, the second crankpin adjoining portion has an outer radius smaller than, or equal to, the second outer radius. Thereby, the crankshaft provides conditions for optimizing the measurements of a crankcase so as to provide a small free volume thereof without using fillers on the crankshaft.

Optionally, the second crankpin adjoining portion comprises a hole, and wherein the crankpin is received in the hole. Thereby, a rigid and reliable crankshaft is provided while conditions are provided for reducing the free volume of the crankcase without using fillers arranged on the crankshaft.

Optionally, the crankpin is interference fitted into the hole. Thereby, a rigid and reliable crankshaft is provided while conditions are provided for reducing the free volume of the crankcase without using fillers arranged on the crankshaft.

Optionally, the second counterweight comprises a recess at a radially outer portion thereof, and wherein the recess extends in a first angular sector of the second counterweight measured from the rotation axis. Thereby, the free area formed by the recess can be utilized for allowing a piston of the engine to move closer to the rotation axis of the crankshaft. In this manner, the free volume of the crankcase can be further reduced.

Optionally, the first angular sector is smaller than a total angular sector occupied by the second counterweight measured from the rotation axis. Thereby, conditions are provided for allowing a piston of the engine to move closer to the rotation axis of the crankshaft while not significantly reducing the weight and/or the volume of the second counterweight.

Optionally, the first angular sector is within the range of 0.15 to 0.93 of the total angular sector or is within the range of 0.60 to 0.80 of the total angular sector. Thereby, conditions are provided for allowing a piston of the engine to move closer to the rotation axis of the crankshaft while not significantly reducing the weight and/or the volume of the second counterweight.

Optionally, the first angular sector is within the range of 23 degrees to 142 degrees or is within the range of 92 degrees to 122 degrees, measured from the rotation axis. Thereby, conditions are provided for allowing a piston of the engine to move closer to the rotation axis of the crankshaft while not significantly reducing the weight and/or the volume of the second counterweight.

Optionally, the second counterweight comprises an axial end portion facing away from the crank plane, and wherein the recess is provided at the axial end portion of the second counterweight. Thereby, conditions are provided for allowing a piston of the engine to move closer to the rotation axis of the crankshaft while not significantly reducing the weight and/or the volume of the second counterweight.

According to a second aspect of the invention, the object is achieved by a power unit for a crankcase scavenged two stroke piston engine, wherein the power unit comprises a piston, a connecting rod, and a crankshaft according to some embodiments of the present disclosure, and wherein the piston is connected to the crankpin via the connecting rod.

Thereby, a power unit is provided which provides conditions for optimizing the measurements of a crankcase so as to provide a small free volume thereof without using fillers arranged on the crankshaft. In this manner, the free volume of the crankcase can be reduced and the scavenging efficiency of an engine comprising the power unit can thereby be increased without using fillers arranged on the crankshaft.

Accordingly, since the need for using fillers arranged on the crankshaft is reduced, conditions are provided for a power unit saving costs, weight, and complexity of an engine. In addition, by not arranging fillers on the crankshaft, the lubrication of bearings of the engine can be increased, such as a crank bearing attached to the crankpin and main bearings supporting the crankshaft relative to a crankcase of the engine.

Accordingly, a power unit is provided overcoming, or at least alleviating, at least some of the above-mentioned problems and drawbacks. As a result, the above-mentioned object is achieved.

Optionally, the piston comprises a portion cyclically assuming a first position relative to the rotation axis of the crankshaft in which the radial distance between the portion of the piston and the rotation axis is shorter than the second outer radius of the second counterweight. Thereby, a power unit is provided allowing the piston to move to a position close to the rotation axis of the crankshaft. In this manner, the free volume of a crankcase of an engine comprising the power unit can be further reduced.

Optionally, the portion of the piston extends into the recess when the portion of the piston is in the first position. Thereby, a power unit is provided allowing the piston to move to a position close to the rotation axis of the crankshaft. In this manner, the free volume of a crankcase of an engine comprising the power unit can be further reduced.

Optionally, the piston comprises an aperture configured to cyclically superimpose an intake of a stratified scavenging intake arrangement of an engine, and wherein the portion of the piston is a portion of a section forming part of delimiting surfaces of the aperture. Thereby, the piston is allowed to move closer to the rotation axis of the crankshaft, while having the section forming part of the delimiting surfaces of the aperture.

According to a third aspect of the invention, the object is achieved by a crankcase scavenged two stroke piston engine comprising a crankcase, a cylinder, and a power unit according to some embodiments of the present disclosure, wherein the piston of the power unit is configured to reciprocate in the cylinder during operation of the engine.

Thereby, a crankcase scavenged two stroke piston engine is provided having conditions for a reduced free volume of the crankcase thereof. In this manner, the engine has conditions for operating with higher scavenging efficiency and thereby also higher power output.

Moreover, a crankcase scavenged two stroke piston engine is provided having a reduced need for filers arranged on the crankshaft of the engine. Thereby, an engine is provided having conditions and characteristics suitable for being manufactured and assembled in a cost-efficient manner. Moreover, an engine is provided having conditions for having a lower weight and complexity. In addition, by not arranging fillers on the crankshaft, the lubrication of bearings of the engine can be increased, such as a crank bearing attached to the crankpin and main bearings supporting the crankshaft relative to the crankcase of the engine.

Accordingly, a crankcase scavenged two stroke piston engine is provided overcoming, or at least alleviating, at least some of the above-mentioned problems and drawbacks. As a result, the above-mentioned object is achieved.

Optionally, the crankcase comprises a first enclosure section and a second enclosure section, the first counterweight being configured to rotate in the first enclosure section and the second counterweight being configured to rotate in the second enclosure section during operation of the engine, and wherein the first enclosure section has a smaller outer radius than the second enclosure section measured from the rotation axis of the crankshaft.

Thereby, an engine is provided having conditions for a reduced free volume of the crankcase of the engine. Moreover, an engine is provided capable of utilizing the fact that, in some designs, one of the crankpin adjoining portions needs to be larger in size than the other crankpin adjoining portion, for reducing the free volume of the crankcase of the engine.

Optionally, the crankcase scavenged two stroke piston engine is a single-cylinder engine.

According to a fourth aspect of the invention, the object is achieved by a hand-held power tool comprising a tool and an engine according to some embodiments of the present disclosure, wherein the engine is configured to power the tool during operation of the hand-held power tool.

Thereby, a hand-held power tool is provided comprising an engine having conditions for operating with higher scavenging efficiency and thereby also higher power output without using fillers arranged on the crankshaft of the engine.

Thereby, a hand-held power tool is provided having conditions and characteristics suitable for being manufactured and assembled in a cost-efficient manner. Moreover, a hand-held power tool is provided having conditions for having a lower weight and complexity.

Accordingly, a hand-held power tool is provided overcoming, or at least alleviating, at least some of the above-mentioned problems and drawbacks. As a result, the above-mentioned object is achieved.

Optionally, the hand-held power tool is a chainsaw.

Thereby, a chainsaw is provided comprising an engine having conditions for operating with higher scavenging efficiency and thereby also at higher power output levels without using fillers arranged on the crankshaft of the engine.

Thereby, a chainsaw is provided having conditions and characteristics suitable for being manufactured and assembled in a cost-efficient manner. Moreover, a chainsaw is provided having conditions for having a lower weight and complexity.

Accordingly, a chainsaw is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
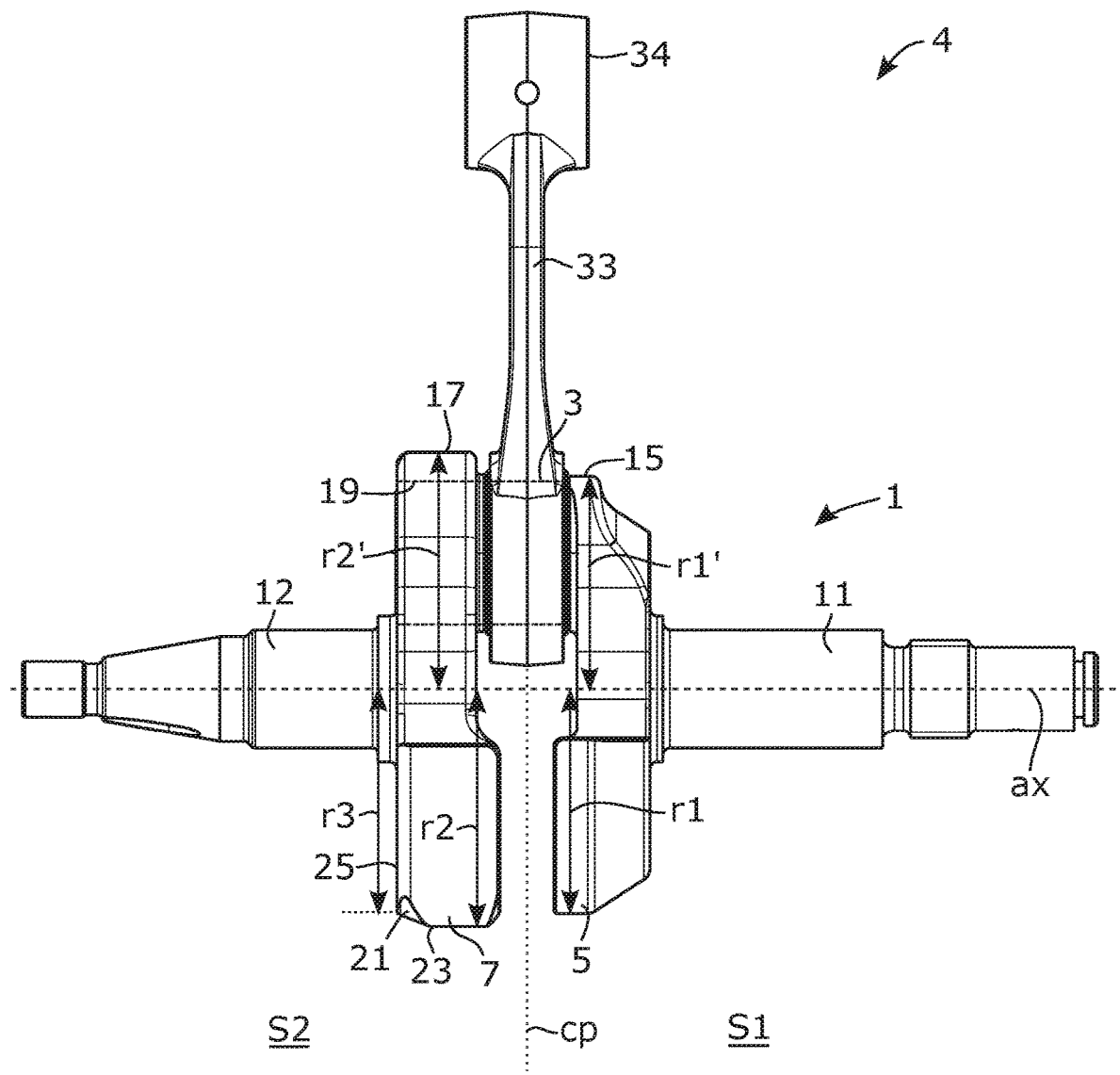
FIG. 1 illustrates a crankshaft/connecting rod assembly according to some embodiments.

FIG. 1 illustrates a crankshaft/connecting rod assembly 4 according to some embodiments. The crankshaft/connecting rod assembly 4 comprises a crankshaft 1 and a connecting rod 33. The crankshaft 1 comprises a crankpin 3 and the connecting rod 33 is connected to the crankpin 3 of the crankshaft 1. The connecting rod 33 may be connected to the crankpin 3 via a crank bearing, such as a needle bearing, or the like.

The crankshaft 1 is a crankshaft for a crankcase scavenged two stroke piston engine, as is further explained herein. The crankshaft 1 is configured to rotate around a rotation axis ax during operation of an engine comprising the crankshaft 1. In FIG. 1, the crankshaft/connecting rod assembly 4 is illustrated in a viewing direction in which the rotation axis ax of the crankshaft 1 is perpendicular to the viewing direction.

The crankpin 3 of the crankshaft 1 is configured to move in a crank plane cp upon rotation of the crankshaft 1 around the rotation axis ax. That is, the crankpin 3 is arranged at a distance from the rotation axis ax and is configured to circulate, i.e. move in a circular path, around the rotation axis ax upon rotation of the crankshaft 1. The crank plane cp is perpendicular to the rotation axis ax. Due to these features, a back and forth movement can be provided of a piston connected to a piston connection portion 34 of the connecting rod 33.

The crankshaft 1 further comprises a first and a second counterweight 5, 7 arranged on either side S1, S2 of the crank plane cp. Each of the first and the second counterweights 5, 7 is arranged opposite to the crankpin 3 relative to the rotation axis ax and each of the first and the second counterweights 5, 7 has a centre of mass at a distance from the rotation axis ax. The first and the second counterweights 5, 7 are designed to counter the inertia effect of the movement of the crankpin 3, the connecting rod 33, and a piston connected to the connecting rod 33 upon rotation of the crankshaft 1. The first counterweight 5 has a first outer radius r1 measured from the rotation axis ax and the second counterweight 7 has a second outer radius r2 measured from the rotation axis ax. As can be seen in FIG. 1, the first outer radius r1 is smaller than the second outer radius r2. Thereby, the crankshaft 1 provides conditions for optimizing the measurements of a crankcase so as to provide a small free volume of the crankcase, as is further explained herein. According to the illustrated embodiments, the first outer radius r1 is approximately 0.943, i.e. approximately 94.3%, of the second outer radius r2. According to further embodiments, the first outer radius r1 may be within the range of 0.8-0.99 of the second outer radius r2 or may be within the range of 0.91-0.97 of the second outer radius r2.

Figure 2:
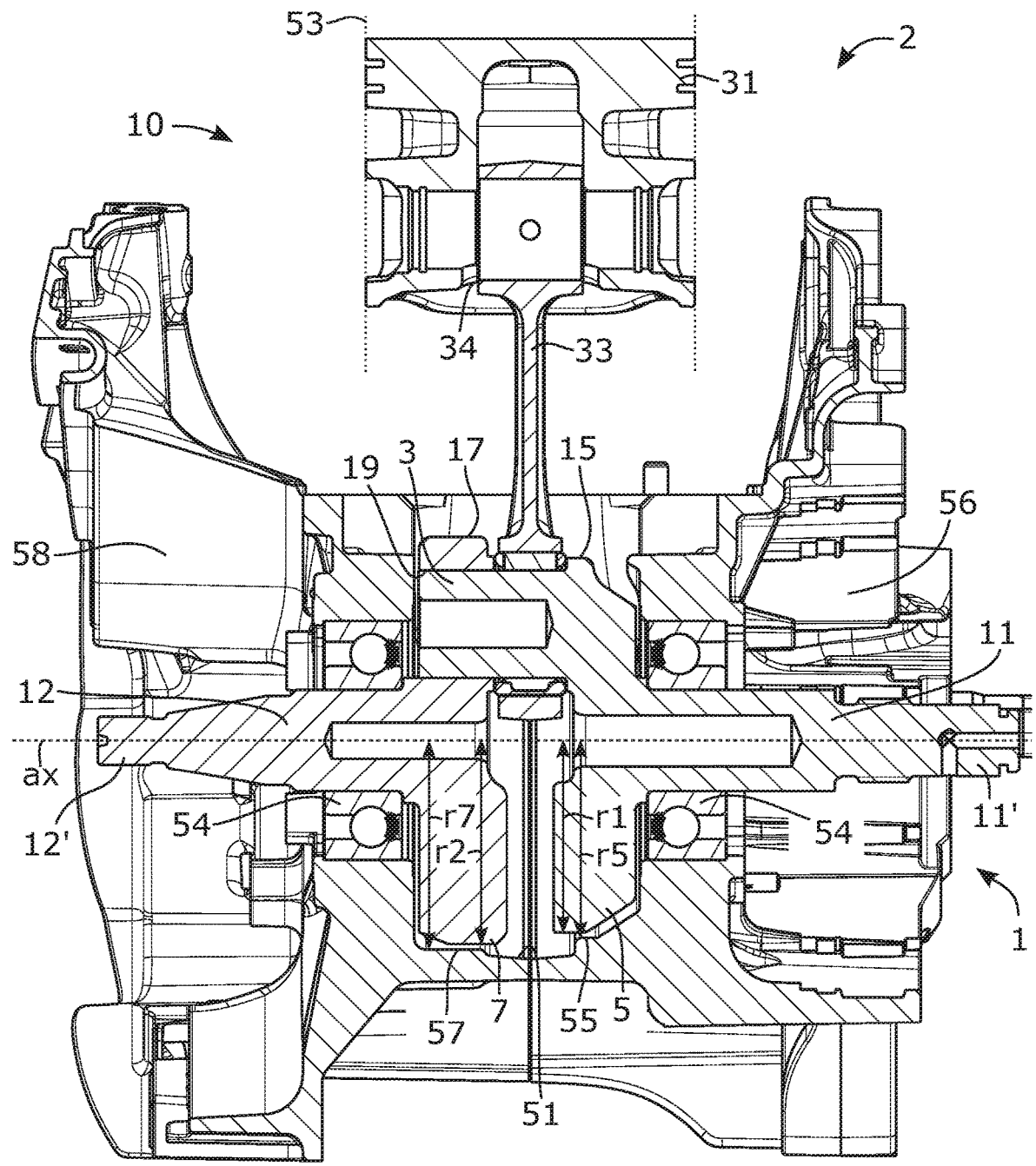
FIG. 2 illustrates a first cross section of a crankcase and a power unit of a crankcase scavenged two stroke piston engine.

FIG. 2 illustrates a first cross section of a crankcase 51 and a power unit 10 of a crankcase scavenged two stroke piston engine 2. The power unit 10 comprises a crankshaft/connecting rod assembly 4 according to the embodiments illustrated in FIG. 1, i.e. a crankshaft 1 and a connecting rod 33, according to the embodiments illustrated in FIG. 1, and a piston 31 connected to the piston connection portion 34 of the connecting rod 33. The crankshaft 1 is arranged in the crankcase 51 and is rotationally arranged around a rotation axis ax relative to the crankcase 51 via main bearings 54. Main bearings 54 are sometimes referred to as crank shaft bearings 54. The piston 31 is thus connected to the crankpin 3 of the crankshaft 1 via the connecting rod 33. In FIG. 2, a cylinder 53 of the engine 2 is schematically indicated. The piston 31 is configured to reciprocate in the cylinder 53 upon rotation of the crankshaft 1. In FIG. 2, the piston 31 and the crankshaft 1 are illustrated in positions corresponding to a top dead centre of the piston 31 relative to the cylinder 53.

As seen in FIG. 2, the crankcase 51 comprises a first enclosure section 55 and a second enclosure section 57. The first counterweight 5 is configured to rotate in the first enclosure section 55 and the second counterweight 7 is configured to rotate in the second enclosure section 57 upon rotation of the crankshaft 1 around the rotation axis ax. Each of the first and second enclosure sections 55, 57 comprises arc-shaped delimiting surfaces arranged at a small distance from the respective first and second counterweights 5, 7. As seen in FIG. 2, the first enclosure section 55 has a smaller outer radius r5 than the second enclosure section 57 measured from the rotation axis ax of the crankshaft 1. Thus, the smaller outer radius r1 of first counterweight 5 is utilized to reduce the free volume inside the crankcase 51 by arranging the first enclosure section 55 with a reduced outer radius r5.

According to the illustrated embodiments, the crankshaft 1 is a two-piece crankshaft comprising a first one-piece crankshaft portion 11 and a second one-piece crankshaft portion 12. According to the illustrated embodiments, each of the first and second one-piece crankshaft portions 11, 12 is formed in one piece of continuous material, such as a steel-material. The first one-piece crankshaft portion 11 is in some places herein referred to as "the first crankshaft portion 11" and the second one-piece crankshaft portion 12 is in some places herein referred to as "the second crankshaft portion 12". The first crankshaft portion 11 comprises the first counterweight 5, the crankpin 3, and a first crankpin adjoining portion 15 adjacent to the crankpin 3. The first crankpin adjoining portion 15 is arranged opposite to the first counterweight 5 relative to the rotation axis ax.

The second crankshaft portion 12 comprises the second counterweight 7 and a second crankpin adjoining portion 17 arranged adjacent to the crankpin 3. The second crankpin adjoining portion 17 is arranged opposite to the second counterweight 7 relative to the rotation axis ax. Moreover, first crankshaft portion 11 comprises a first shaft portion 11' and the second crankshaft portion 12 comprises a second shaft portion 12'. Each of the first and second shaft portions 11', 12' is accommodated in a main bearing 54. Moreover, according to the illustrated embodiments, the first shaft portion 11' is configured to provide power output from the engine 2 via a clutch arranged in a clutch housing 56. The first shaft portion 11' may therefore be referred to as an output shaft of the engine 2. Moreover, according to the illustrated embodiments, the second shaft portion 12' is configured to be connected to a flywheel arranged in a flywheel housing 58.

The second crankpin adjoining portion 17 comprises a hole 19. As seen in FIG. 2, the crankpin 3 is received in the hole 19. According to the illustrated embodiments, the crankpin 3 is interference fitted into the hole 19. The wording interference fit, as used herein, is intended to encompass a press fit, a shrink fit, or a friction fit which all are forms of fastening between two tight fitting mating parts that produces a joint which is held together by friction after the parts are assembled. Since the crankpin 3 forms part of the first crankshaft portion 11, the first crankpin adjoining portion 15 can be provided with a smaller outer radius r1' than the second crankpin adjoining portion 17. The outer radius r1' of the first crankpin adjoining portion 15 is indicated in FIG. 1.

Figure 3:
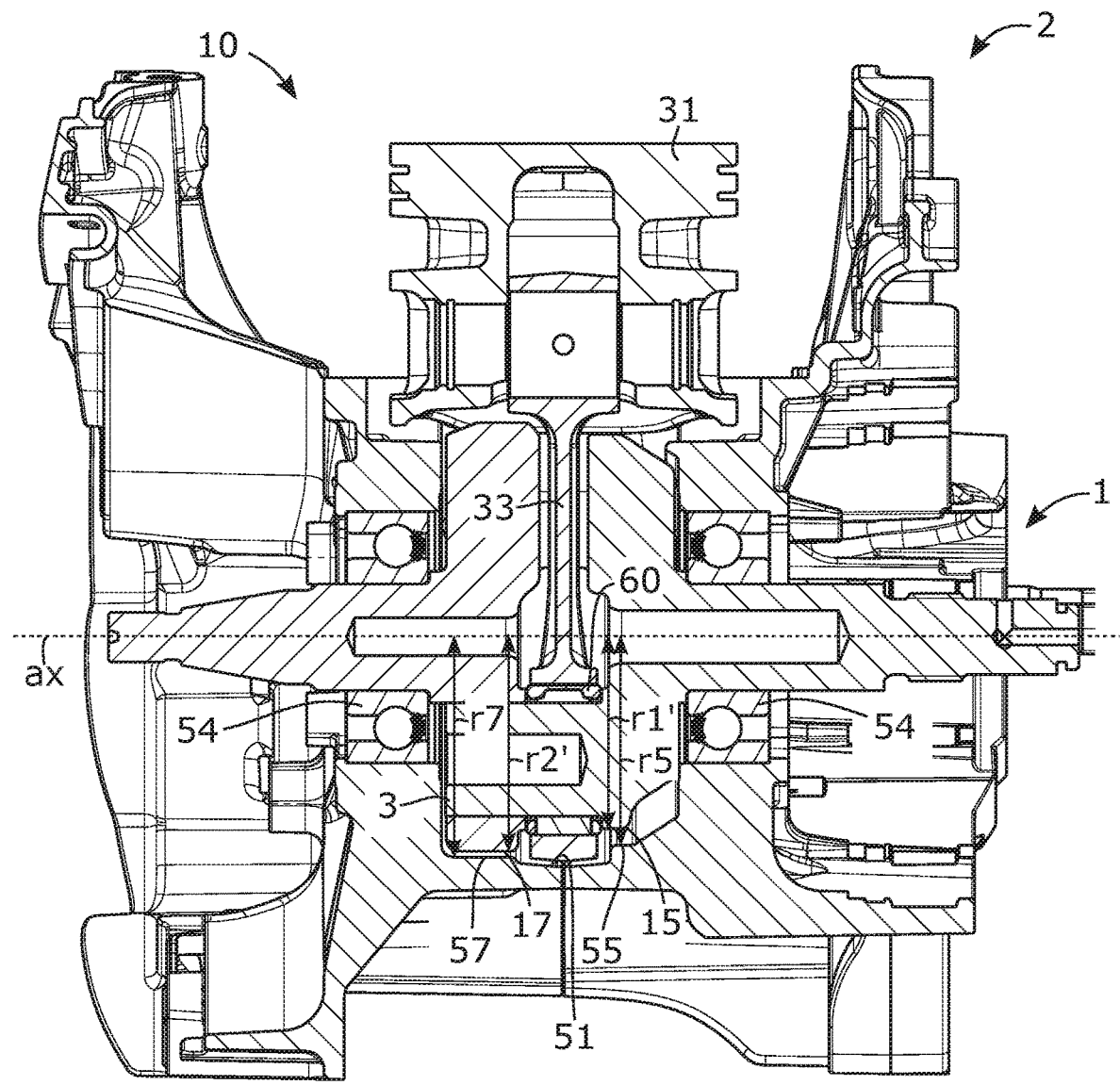
FIG. 3 illustrates a second cross section of the crankcase and the power unit illustrated in FIG. 2.

FIG. 3 illustrates a second cross section of the crankcase 51 and the power unit 10 illustrated in FIG. 2. In FIG. 3, the piston 31 and the crankshaft 1 are illustrated in positions corresponding to a bottom dead centre of the piston 31 relative to the cylinder 53. As seen in FIG. 3, the first crankpin adjoining portion 15 is located in the first enclosure section 55 and the second crankpin adjoining portion 17 is located in the second enclosure section 57 when the piston 31 is in a region of the bottom dead centre, whereas the first counterweight 5 is located in the first enclosure section 55 and the counterweight 7 is located in the second enclosure section 57 when the piston 31 is in a region of the top dead centre, as seen in FIG. 2.

As is indicated in FIG. 1, the first crankpin adjoining portion 15 has an outer radius r1' smaller than, or equal to, the first outer radius r1 of the first counterweight 5. Likewise, the second crankpin adjoining portion 17 has an outer radius r2' smaller than, or equal to, the second outer radius r2 of the second counterweight 7. In this manner, the crankshaft 1 can rotate in the crankcase 51 without hitting any delimiting surfaces of the crankcase 51. Moreover, the fact that the first crankpin adjoining portion 15 can be provided with a smaller outer radius r1' than the outer radius r2' of the second crankpin adjoining portion 17 is utilized to minimize the free volume of the crankcase 51. In this manner, a crankcase 51 having a small free volume can be obtained without using fillers arranged on the crankshaft 1. According to the illustrated embodiments, the crankshaft 1 comprises no fillers. Fillers are profiles attached to a crankshaft to reduce the free volume of a crankcase. Fillers are effective in reducing the free volume of a crankshaft. However, they add costs, weight, and complexity to two-stroke engines. Moreover, fillers may impair the lubrication of a crank bearing 60 arranged between the crankpin 3 and the connecting rod 33 and may impair lubrication of main bearings 54 supporting the crankshaft 1 relative to the crankcase 51. Most crankcase scavenged two-stroke piston engines are lubricated by adding a lubrication to the fuel, wherein an air/fuel mixture comprising the lubricant is led through the inner volume of the crankcase. Thus, by arranging fillers onto the crankshaft, these fillers may limit the lubrication obtained by the crank bearing arranged between the crankpin and the connecting rod as well as of main bearings supporting the crankshaft relative to the crankcase.

Accordingly, since the crankshaft 1 according to the embodiments herein is capable of reducing the free volume of the crankcase 51 without using fillers, the crankshaft 1 provides conditions for saving costs, weight, and complexity of a two-stroke engine 2, while conditions are provided for obtaining a high degree of lubrication of the crank bearing 60 arranged between the crankpin 3 and the connecting rod 33 as well as of main bearings 54 supporting the crankshaft 1 relative to the crankcase 51.

Figure 4:
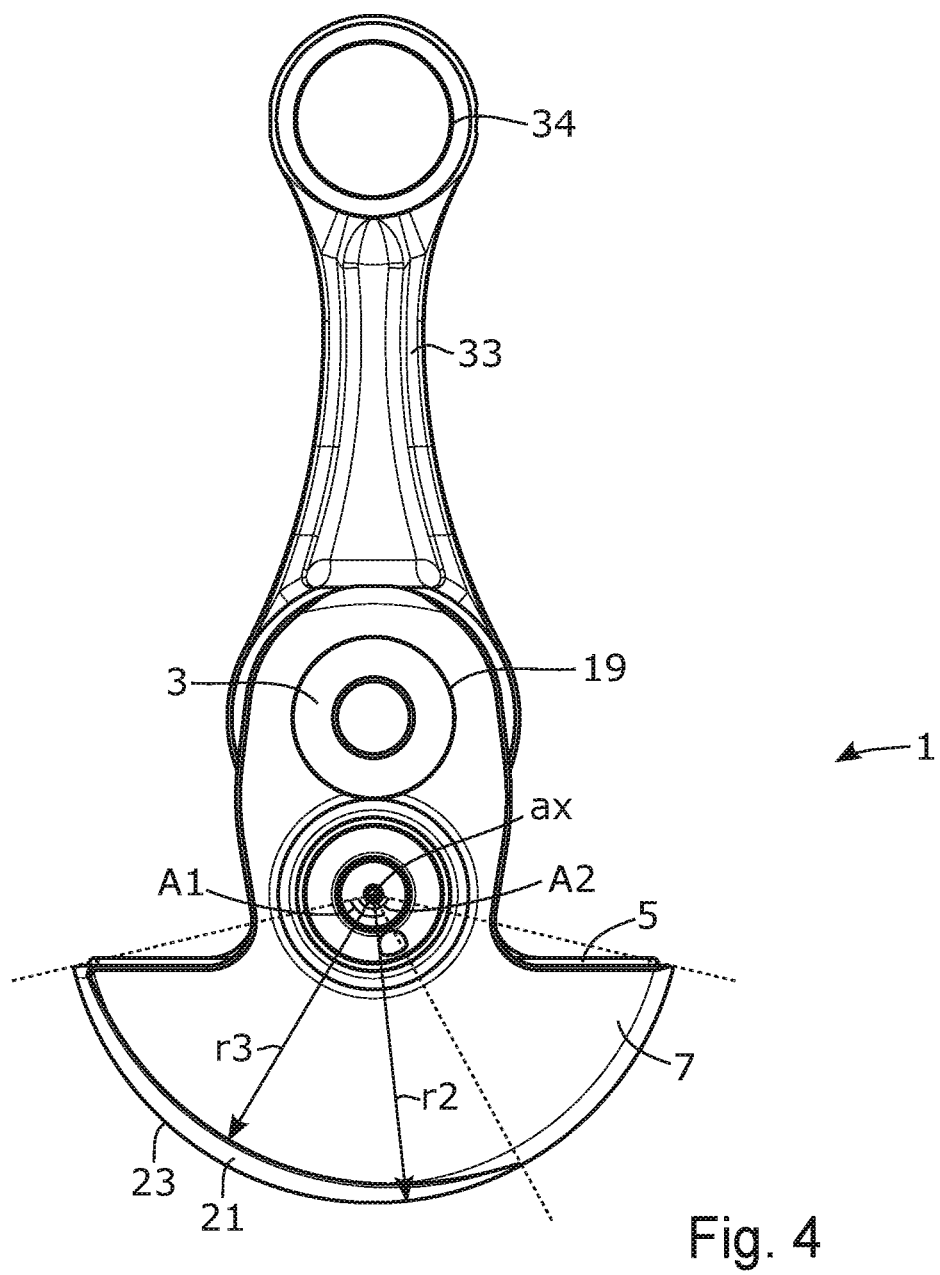
FIG. 4 illustrates a side view of the crankshaft/connecting rod assembly according to the embodiments illustrated in FIG. 1.

FIG. 4 illustrates a side view of the crankshaft/connecting rod assembly 4 according to the embodiments illustrated in FIG. 1. In FIG. 4, the crankshaft/connecting rod assembly 4 is illustrated in a viewing direction coinciding with the rotation axis ax of the crankshaft 1. Moreover, in FIG. 4, the crankshaft/connecting rod assembly 4 is illustrated from a second side S2 of the assembly 4. The second side S2 of the assembly 4 is indicated in FIG. 1. As clearly seen in FIG. 1, the second side S2 comprises the second counterweight 7.

As is indicated in FIG. 1 and FIG. 4, according to the illustrated embodiments, the second counterweight 7 comprises a recess 21 at a radially outer portion 23 thereof. Moreover, as is indicated in FIG. 1, the recess 21 is provided at an axial end portion 25 of the second counterweight 7, wherein the axial end portion 25 faces away from the crank plane cp. The recess 21 is made such that the radius r3 measured from the rotation axis ax of the crankshaft 1 to a delimiting surface of the recess 21 at the axial end portion 25 of the second counterweight 7 is smaller than the second outer radius r2 of the second counterweight 7. Thereby, a piston connected to the piston connection portion 34 of the connecting rod 33 is allowed to move closer to the rotation axis ax of the crankshaft 1 when the piston is in a region of the bottom dead centre. In this manner, the free volume in a crankcase comprising the crankshaft can be further minimized, as is further explained herein.

As indicated in FIG. 4, the recess 21 extends in a first angular sector A1 of the second counterweight 7 measured from the rotation axis ax of the crankshaft 1. According to the illustrated embodiments, the first angular sector A1 is smaller than a total angular sector A2 occupied by the second counterweight 7 measured from the rotation axis ax of the crankshaft 1. Moreover, according to the illustrated embodiments, the first angular sector A1 is approximately 0.69, i.e. approximately 69%, of the total angular sector A2. According to further embodiments, the first angular sector A1 may be within the range of 0.15 to 0.93 of the total angular sector A2 or may be within the range of 0.60 to 0.80 of the total angular sector A2.

According to the illustrated embodiments, the first angular sector A1 is approximately 105 degrees and the total angular sector A2 occupied by the second counterweight 7 is approximately 154 degrees measured from the rotation axis ax. According to further embodiments, the first angular sector A1 may be within the range of 23 degrees to 142 degrees or may be within the range of 92 degrees to 122 degrees, measured from the rotation axis ax of the crankshaft 1. Due to these features, it is ensured that a piston connected to the piston connection portion 34 of the connecting rod 33 is allowed to move closer to the rotation axis ax of the crankshaft 1 when the piston moves past the region of the bottom dead centre.

Figure 5:
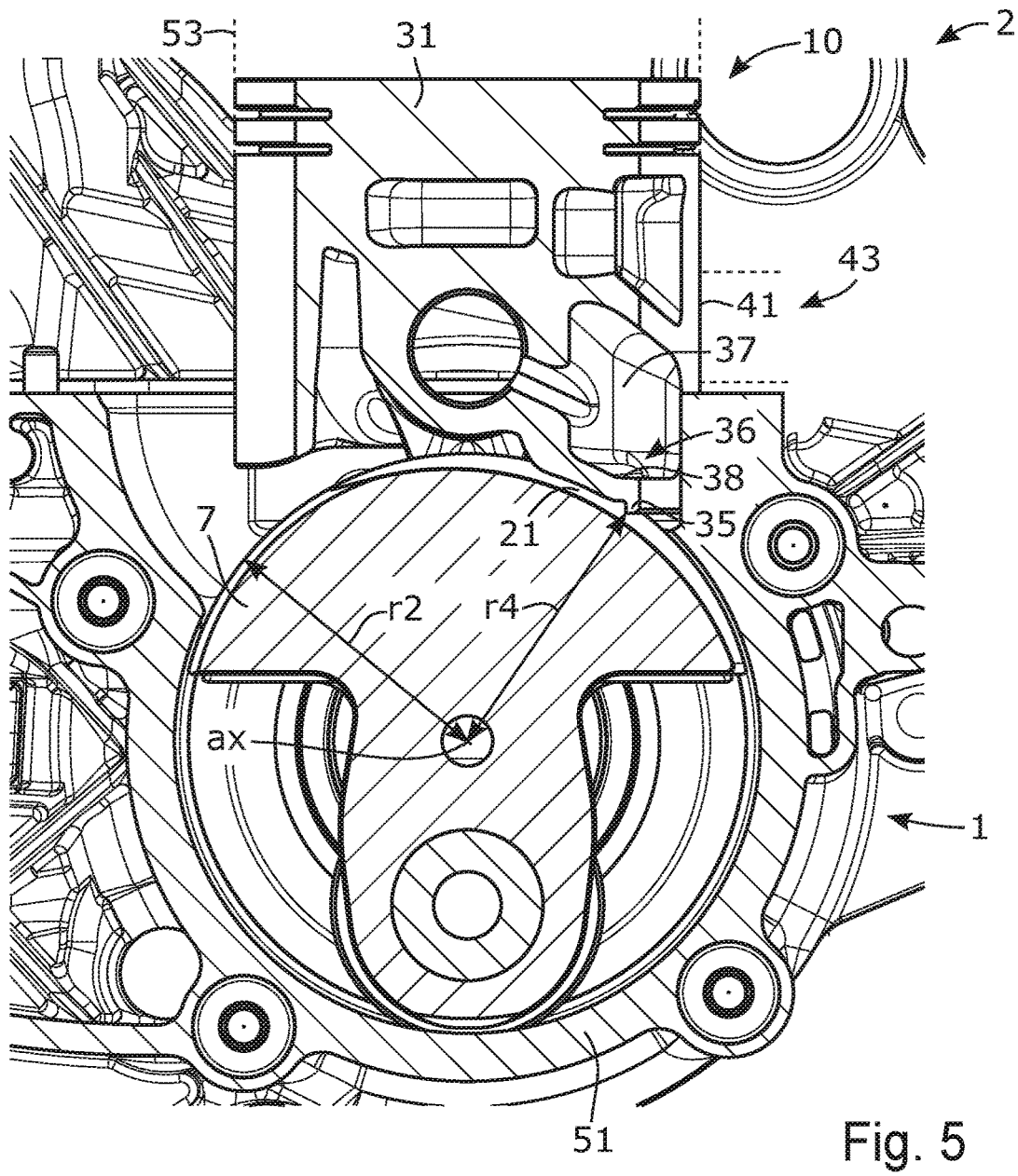
FIG. 5 illustrates a third cross section of the crankcase and the power unit illustrated in FIG. 2 and FIG. 3.

FIG. 5 illustrates a third cross section of the crankcase 51 and the power unit 10 illustrated in FIG. 2 and FIG. 3. In FIG. 5, the viewing direction coincides with the rotation axis ax of the crankshaft 1. Moreover, the viewing direction is in a direction towards the second side of the crankshaft 1 comprising the second counterweight 7, as referred to above. In FIG. 5, the piston 31 and the crankshaft 1 are illustrated in positions corresponding to a bottom dead centre of the piston 31 relative to the cylinder 53.

The piston 31 comprises a portion 35 cyclically assuming a first position relative to the rotation axis ax of the crankshaft 1 in which the radial distance r4 between the portion 35 of the piston 31 and the rotation axis ax is shorter than the second outer radius r2 of the second counterweight 7. According to the illustrated embodiments, the portion 35 of the piston 31 is in the first position when the piston 31 is in the region of the bottom dead centre relative to the cylinder 53. As can be seen in FIG. 5, the portion 35 of the piston 31 extends into the recess 21 when the portion 35 of the piston 31 is in the first position. According to the illustrated embodiments, the portion 35 of the piston 31 forms part of a stratified scavenging intake arrangement 43 of an engine 2. That is, according to the illustrated embodiments, the piston 31 comprises an aperture 37. The aperture 37 is configured to cyclically superimpose an intake 41 of a stratified scavenging intake arrangement 43 of an engine 2, so as to transfer air from the intake 41 to an intake port of the engine 2 during operation of the engine 2. In this manner, emissions of unburnt hydrocarbons from the engine 2 can be reduced. The portion 35 of the piston 31, which extends into the recess 21 when the portion 35 of the piston 31 is in the first position, is a portion 35 of a section 36 forming part of delimiting surfaces 38 of the aperture 37.

Thus, due to the recess 21, the piston 31 is allowed to move closer to the rotation axis ax of the crankshaft 1 when the piston 31 is in a region of the bottom dead centre, while having the section 36 forming part of the delimiting surfaces 38 of the aperture 37.

According to embodiments herein, the crankshaft 1 explained above may comprise a first and a second counterweight 5, 7 arranged on either side S1, S2 of the crank plane cp, wherein the first and second counterweights 5, 7 have the same outer radiuses r1, r2 measured from the rotation axis ax of the crankshaft 1, and wherein one of the first and second counterweights 5, 7 has a recess 21 as explained with reference to FIG. 1, FIG. 4 and FIG. 5. In this manner, conditions are provided for reducing the free volume of the crankcase 51 of an engine 2 because conditions are provided for letting a piston 31 of the engine 2 to move closer to the rotation axis ax of the crankshaft 1.

Figure 6:
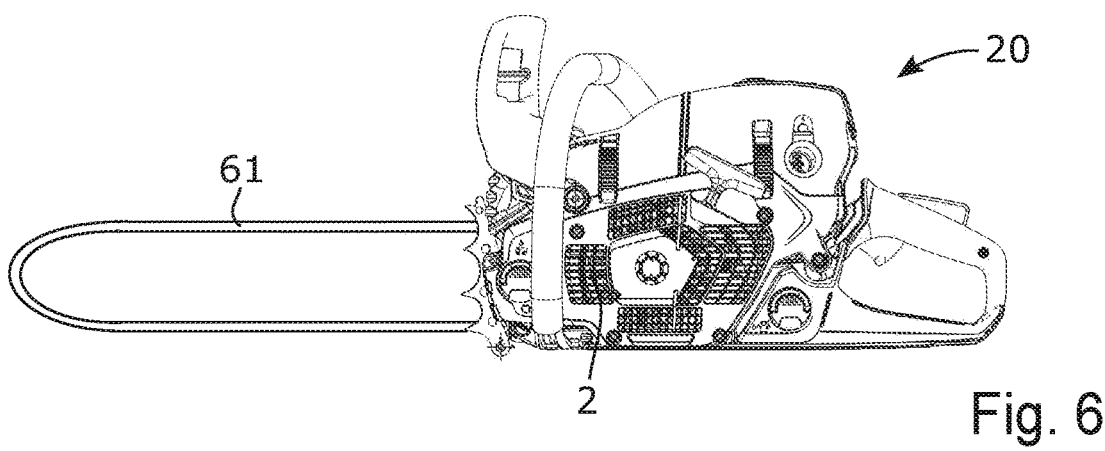
FIG. 6 illustrates a hand-held power tool according to some embodiments.

FIG. 6 illustrates a hand-held power tool 20 according to some embodiments. The hand-held power tool 20 comprises a tool 61 and a crankcase scavenged single-cylinder two stroke piston engine 2, according to the embodiments explained with reference to FIG. 1-FIG. 5. That is, the two stroke piston engine 2 of the power tool 20, may comprise a crankshaft/connecting rod assembly 4 according to the embodiments explained with reference to FIG. 1 and FIG. 4 and/or a crankcase 51 and a power unit 10, according to the embodiments explained with reference to FIG. 2, FIG. 3, and FIG. 5.

The crankcase scavenged two stroke piston engine 2 is configured to power the tool 61 during operation of the hand-held power tool 20. According to the illustrated embodiments, the hand-held power tool 20 is a chainsaw, i.e. a power tool 20 comprising a tool 61 in the form of a cutting chain 61. According to further embodiments, the hand-held power tool 20, as referred to herein, may be another type of hand-held power tool, such as a trimmer, a brush cutter, a debris blower, a circular saw, a multi-tool, a hedge trimmer, or the like.

The wording "hand-held" indicates that the power tool referred to is portable and is configured to be supported by one or two hands of a user during operation of the power tool.

An outer radius, as referred to herein, is a radius measured from the rotation axis ax of the crankshaft 1 to a radially outer portion of the object referred to. Moreover, an outer radius, as referred to herein, may be measured in a plane parallel to the crank plane cp. Likewise, an angular sector, as referred to herein, may be located in a plane being parallel to the crank plane cp.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A crankshaft for a crankcase scavenged two stroke piston engine,
   wherein the crankshaft is configured to rotate around a rotation axis during operation,
   and wherein the crankshaft comprises:
   a crankpin configured to move in a crank plane upon rotation of the crankshaft, and
   a first and a second counterweight arranged on either side of the crank plane,
   wherein the first counterweight has a first outer radius measured from the rotation axis and the second counterweight has a second outer radius measured from the rotation axis,
   wherein the first outer radius is smaller than the second outer radius, and
   wherein the second counterweight comprises a recess at a radially outer portion thereof, and wherein the recess extends in a first angular sector of the second counterweight measured from the rotation axis, wherein the first angular sector is smaller than a total angular sector occupied by the second counterweight measured from the rotation axis.

2. The crankshaft according to claim 1, wherein the first outer radius is within the range of 0.8-0.99 of the second outer radius or is within the range of 0.91-0.97 of the second outer radius.

3. The crankshaft (1) according to claim 1, wherein the crankshaft comprises a first crankshaft portion comprising the first counterweight and a first crankpin adjoining portion arranged opposite to the first counterweight relative to the rotation axis, and wherein the first crankpin adjoining portion has an outer radius smaller than, or equal to, the first outer radius.

4. The crankshaft according to claim 3, wherein the first crankshaft portion comprises the crankpin, and wherein the first crankshaft portion constitutes a first one-piece crankshaft portion of the crankshaft.

5. The crankshaft according to claim 4, wherein the crankshaft comprises a second one-piece crankshaft portion comprising the second counterweight and a second crankpin adjoining portion arranged opposite to the second counterweight relative to the rotation axis.

6. The crankshaft according to claim 5, wherein the second crankpin adjoining portion has an outer radius smaller than, or equal to, the second outer radius.

7. The crankshaft according to claim 5, wherein the second crankpin adjoining portion comprises a hole, and wherein the crankpin is received in the hole.

8. The crankshaft according to claim 7, wherein the crankpin is interference fitted into the hole.

9. The crankshaft according to claim 1, wherein the first angular sector is within the range of 0.15 to 0.93 of the total angular sector or is within the range of 0.60 to 0.80 of the total angular sector.

10. The crankshaft according to claim 1, wherein the first angular sector is within the range of 23 degrees to 142 degrees or is within the range of 92 degrees to 122 degrees, measured from the rotation axis.

11. The crankshaft according to claim 1, wherein the second counterweight comprises an axial end portion facing away from the crank plane, and wherein the recess is provided at the axial end portion of the second counterweight.

12. A power unit for a crankcase scavenged two stroke piston engine, wherein the power unit comprises a piston, a connecting rod, and the crankshaft according to claim 1, and wherein the piston is connected to the crankpin via the connecting rod.

13. The power unit according to claim 12, wherein the piston comprises a portion cyclically assuming a first position relative to the rotation axis of the crankshaft in which a radial distance between the portion of the piston and the rotation axis is shorter than the second outer radius of the second counterweight.

14. The power unit according to claim 13, wherein the portion of the piston extends into a recess of the second counterweight when the portion of the piston is in the first position.

15. The power unit according to claim 14, wherein the piston comprises an aperture configured to cyclically superimpose an intake of a stratified scavenging intake arrangement of an engine, and wherein the portion of the piston is a portion of a section forming part of delimiting surfaces of the aperture.

16. A crankcase scavenged two stroke piston engine comprising a crankcase, a cylinder, and the power unit according to claim 14, wherein the piston of the power unit is configured to reciprocate in the cylinder during operation of the engine.

17. The engine according to claim 16, wherein the crankcase comprises a first enclosure section and a second enclosure section, the first counterweight being configured to rotate in the first enclosure section and the second counterweight being configured to rotate in the second enclosure section during operation of the engine, and wherein the first enclosure section has a smaller outer radius than the second enclosure section measured from the rotation axis of the crankshaft.

18. A hand-held power tool comprising a tool and the engine according to claim 16, wherein the engine is configured to power the tool during operation of the hand-held power tool, and wherein the hand-held power tool is a chainsaw.

19. A crankshaft for a crankcase scavenged two stroke piston engine,
wherein the crankshaft is configured to rotate around a rotation axis during operation, and wherein the crankshaft comprises:
a crankpin configured to move in a crank plane upon rotation of the crankshaft, and
a first and a second counterweight arranged on either side of the crank plane,
wherein the first counterweight has a first outer radius measured from the rotation axis and the second counterweight has a second outer radius measured from the rotation axis,
wherein the first outer radius is smaller than the second outer radius, and
wherein the second counterweight comprises a recess at a radially outer portion thereof, and wherein the recess extends in a first angular sector of the second counterweight measured from the rotation axis,
wherein the second counterweight comprises an axial end portion facing away from the crank plane, and wherein the recess is provided at the axial end portion of the second counterweight.

20. A crankshaft for a crankcase scavenged two stroke piston engine,
wherein the crankshaft is configured to rotate around a rotation axis during operation, and wherein the crankshaft comprises:
a crankpin configured to move in a crank plane upon rotation of the crankshaft, and
a first and a second counterweight arranged on either side of the crank plane,
wherein the second counterweight comprises a recess at a radially outer portion thereof, and wherein the recess extends in a first angular sector of the second counterweight measured from the rotation axis, wherein the first angular sector is smaller than a total angular sector occupied by the second counterweight measured from the rotation axis.

* * * * *

UNITED STATES PATENT AND TRADEMARK OFFICE
CERTIFICATE OF CORRECTION

PATENT NO. : 11,852,071 B2
APPLICATION NO. : 17/908749
DATED : December 26, 2023
INVENTOR(S) : Patrik Sigurdh et al.

It is certified that error appears in the above-identified patent and that said Letters Patent is hereby corrected as shown below:

In the Claims

In Column 12, Claim 16, Line 65, "claim 14" should read --claim 12--

Signed and Sealed this
Twenty-sixth Day of March, 2024

Katherine Kelly Vidal
*Director of the United States Patent and Trademark Office*